May 24, 1960 J. F. WOOD 2,937,816

DRIVE MECHANISM

Filed July 25, 1955 3 Sheets-Sheet 1

Inventor
John F. Wood
By Alois W. Graf
Attorney

Fig. 4
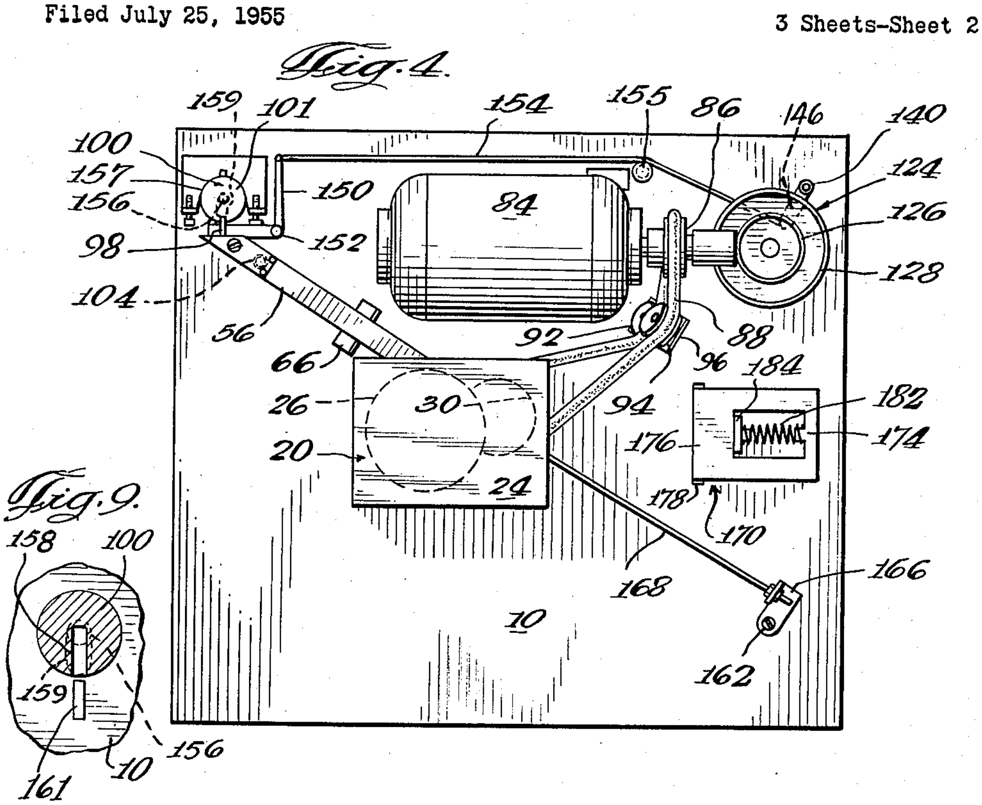
Fig. 4, Fig. 9
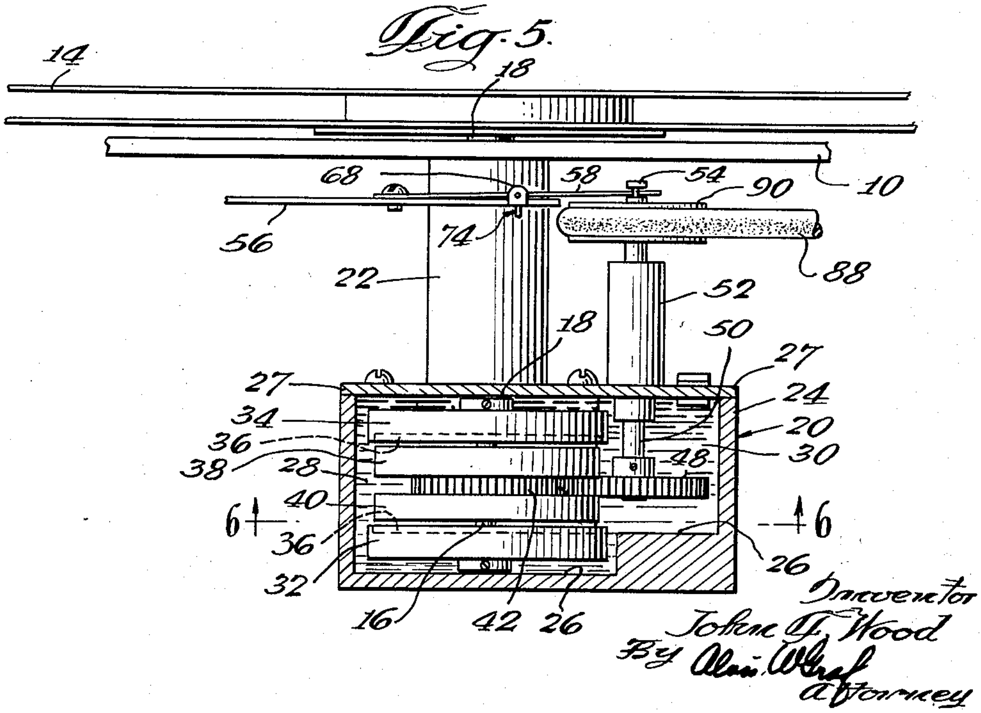
Fig. 5
Inventor
John F. Wood
By Alan W. Graf
Attorney

DRIVE MECHANISM

Filed July 25, 1955

Inventor
John F. Wood
By Alois W. Graf
Attorney

United States Patent Office 2,937,816

Patented May 24, 1960

2,937,816

DRIVE MECHANISM

John F. Wood, Buchanan, Mich., assignor to Electro-Voice, Incorporated, Buchanan, Mich.

Filed July 25, 1955, Ser. No. 524,155

12 Claims. (Cl. 242—55.12)

The present invention relates to drive mechanisms for transporting wire or tape, particularly drive mechanisms for sound recording and reproducing devices.

Magnetic sound recording and reproducing devices require an elongated mass in the form of a wire or tape, and a drive mechanism which is capable of transporting the wire or tape at a sufficient speed to reproduce quality sound while handling the wire or tape with sufficient gentleness to prevent breakage thereof. In addition, the drive mechanism must transport the wire or tape at the same velocity when reproducing sound as was employed in recording the sound, preferably a constant velocity. Further, it is desirable that the drive mechanism be capable of fast forward and reverse, as well as starting and stopping instantly.

Many of the more expensive tape drive mechanisms employ three motors combined with mechanical brakes, one motor driving the take-up reel, one motor driving the supply reel, and the third forming a capstan which directly engages the tape. Less expensive devices use one or two motors with associated slip clutches and brakes. However, slip clutches have coupling coefficients which vary over a wide range under conditions of wear and operating speed, and as a result difficulties are encountered in obtaining smooth jerk-free torque transmission from the motor to the take-up and supply reels.

An additional difficulty is experienced in drive mechanisms employing a capstan for translating tape in that the diameter of the tape on the supply and take-up reels changes while the machine is operating. The torque upon the take-up reel is usually constant during forward operation, but the tension on the tape between the take-up reel and the capstan decreases as the tape builds up on the take-up reel. In like manner, the torque supplied by the drag on the supply reel is constant, thus increasing the tension on the tape between the supply reel and the capstan as the effective diameter of the supply reel is decreased. It is very desirable to maintain the tension upon the tape at a constant optimum value in order to minimize stretch of the tape and wear of the recording and transcription heads, while at the same time maintaining good contact between the tape and the recording and transcription heads. It is therefore one of the objects of the present invention to provide a drive mechanism which is suitable for use with tape or wire which provides a varying torque upon the feed and take-up reels.

It is also an object of the present invention to provide a drive mechanism for transporting wire or tape smoothly and without jerks, this drive mechanism being free from slip clutches and brakes.

A further object of the present invention is to provide a drive mechanism for tape or wire which is compact and requires less space than the devices presently known to the art.

These and other objects of the present invention will become more fully understandable to the man skilled in the art from a further reading of the present disclosure, particularly when viewed in the light of the drawings, in which:

Figure 4 is a bottom elevational view of the drive mechanism shown in Figures 1, 2 and 3;

Figure 5 is a sectional view taken along the line 5—5 of Figure 1;

Figure 9 is a sectional view taken along the line 9—9 of Figure 2.

Figures 1, 2:
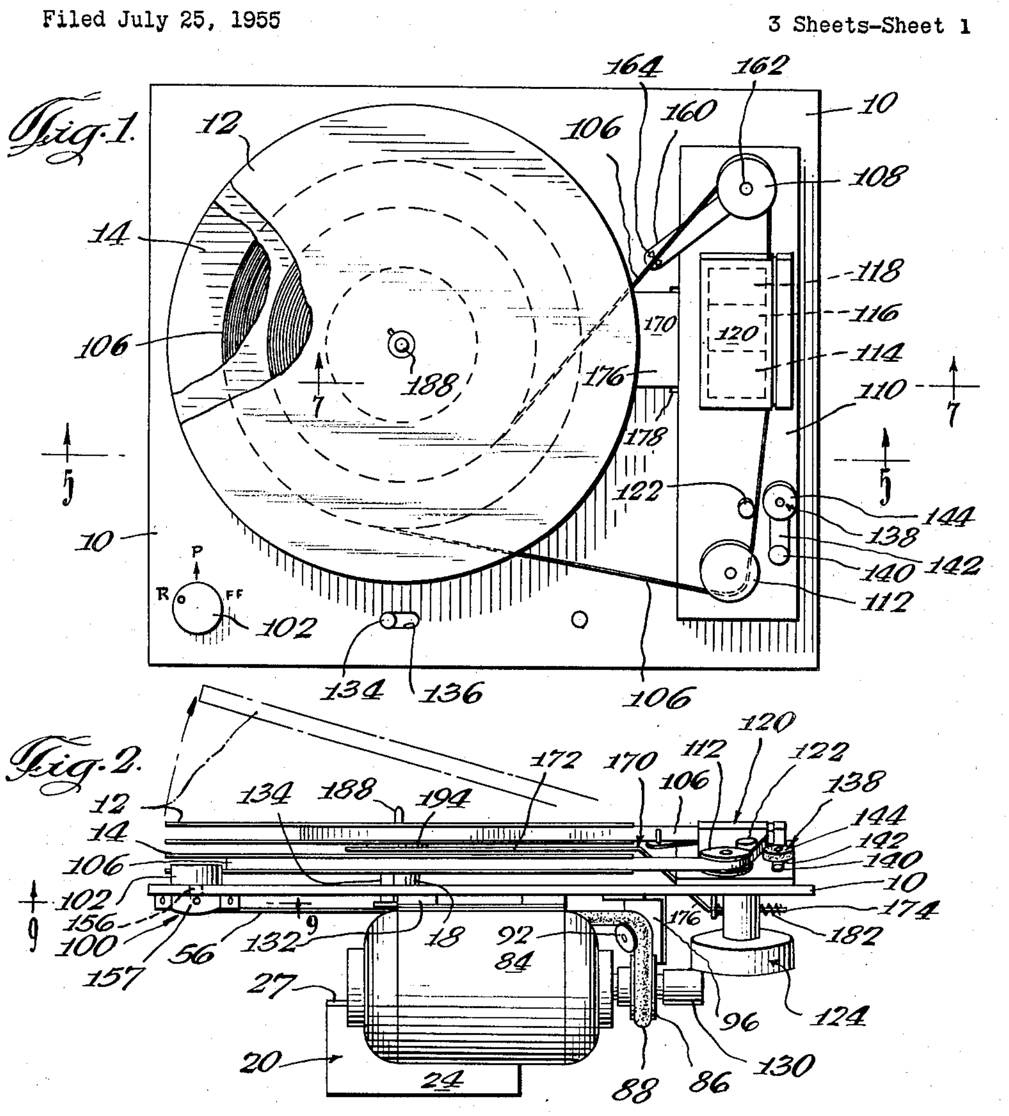
Figure 1 is a plan view of a drive mechanism constructed according to the teachings of the present invention.
Figure 2 is a front elevational view of the drive mechanism illustrated in Figure 1.
Figure 3:
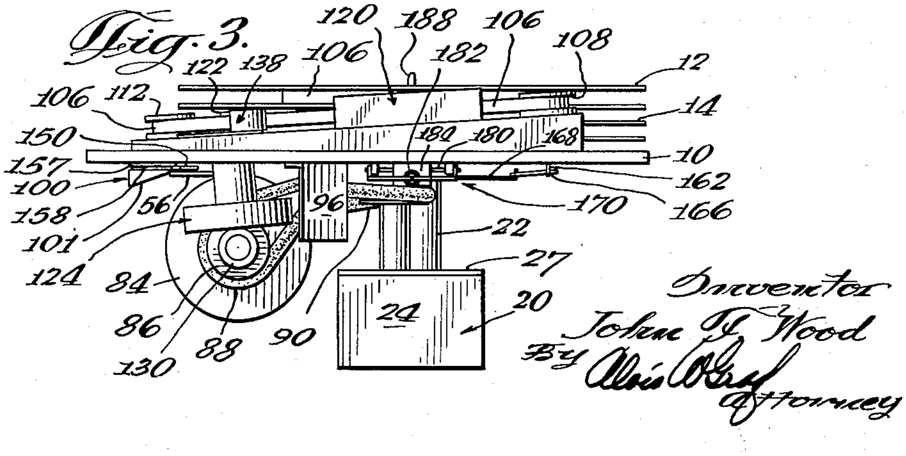
Figure 3 is a side elevational view of the drive mechanism illustrated in Figures 1 and 2.
Figures 6, 7, 8:
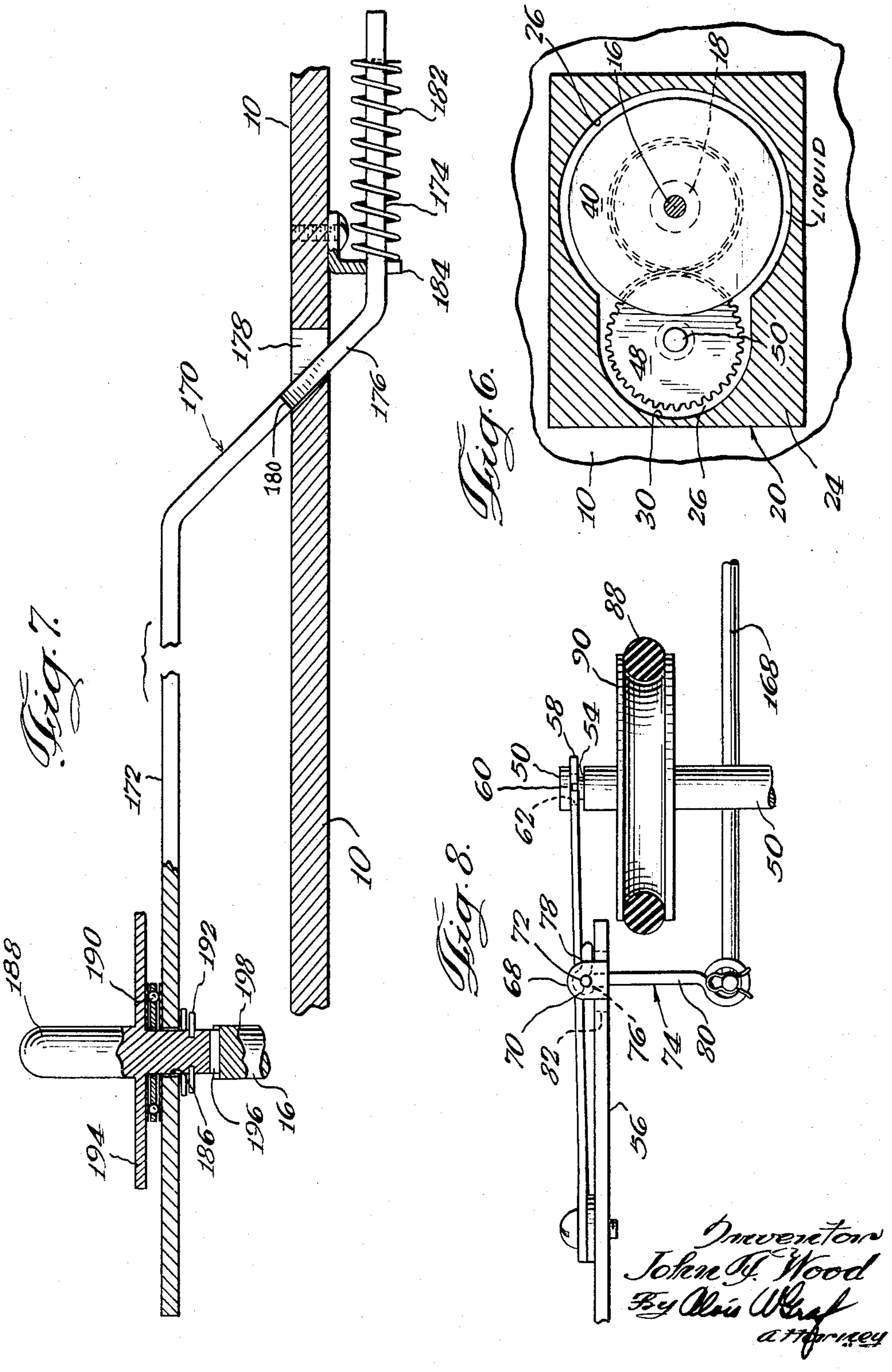
Figure 6 is a sectional view taken along the line 6—6 of Figure 5.
Figure 7 is a sectional view taken along the line 7—7 of Figure 1.
Figure 8 is a fragmentary sectional view of the control linkage for the drive mechanism.

The embodiment of the invention illustrated in the figures is a drive mechanism intended for use with tape, although it will be understood that the inventive features of the device are also applicable to a drive mechanism for use with wire. As illustrated in the figures, the drive mechanism is mounted on a base plate 10 and has a tape supply reel 12 disposed above a tape take-up reel 14. The tape supply reel 12 is mechanically connected to the take-up reel 14. Both the shaft 16 and sleeve 18 terminate within a hydraulic drive unit 20 which is secured to the base plate 10 by a hollow tube 22 which surrounds the sleeve 18.

The hydraulic drive unit 20 has a housing 24 with a cavity 26 therein and a cover 27 enclosing the top of the cavity 26. The cavity 26 has a cylindrical portion 28 which communicates with a semi-cylindrical portion 30. The shaft 16 which drives the tape supply reel is journaled on the axis of the cylindrical portion 28 of the cavity 26, and an impeller disc 32 is secured to the shaft 16 adjacent to the lower end of the cavity 26, as viewed in Figure 5. The sleeve 18 which is secured to the tape take-up reel 14 is in like manner journaled coaxially with the cylindrical portion 28 of the cavity 26, and the sleeve 18 connected to a second impeller disc 34 which is positioned adjacent to the top of the cylindrical portion 28 of the cavity 26. The impeller disc 32 is cup shaped being provided with a recess 36 on its side confronting the impeller disc 34, and in like manner the impeller disc 34 is cup shaped having a recess 36 confronting the impeller disc 32. Between the two discs 32 and 34 are a pair of flat impeller discs 38 and 40 which are secured to a spur gear 42 disposed therebetween. The impeller discs 38 and 40 are also journaled about the shaft 16. The spur gear 42 has a smaller diameter than the recesses 36 in the discs 38 and 40, and a second spur gear 48 having approximately the same thickness as the first spur gear 42 is meshed with the first spur gear 42 and disposed within the semi-cylindrical portion 30 of the cavity 26. The second spur gear 48 is secured to a shaft 50 disposed along the axis of the semi-cylindrical portion 30 of the cavity 26 and journaled within the housing 24. The entire cavity 26 is filled with a hydraulic fluid, preferably a constant viscosity oil, so that rotation of the discs 38 and 40 transmits energy to the discs 32 and 34 as a result of the fluid film drag, and hence to the supply reel 12 and take-up reel 14.

The shaft 50 extends through the cover 27 of the housing 24 and is journaled within a sleeve 52 which is secured to the cover 27 of the housing 24. A groove 54 is disposed in shaft 50 adjacent to the end thereof opposite to the spur gear 48, and a control arm 56 is mechanically coupled to the shaft 50 by a spring strip 58.

constructed of spring steel, which is secured to the control arm 56 at one end and engaged within the groove 54 of the shaft 50 at the other end. The end of the spring strip 58 which engages the shaft 50 is provided with an indentation having a circular portion 62 disposed centrally within the strip 58 which is slightly larger in diameter than the grooved portion of the shaft 50 but smaller than the diameter of the shaft itself.

The control arm 56 is mounted to the base 10 by a bracket 66 secured to the base 10 and to the control arm 56 intermediate the flexible strip 58 and the other end of the control arm 56. The control arm 56 is provided with a pair of tabs 68 which extend outwardly therefrom toward the flexible strip 58 and confront the flexible strip 58 at a point approximately midway between the shaft 50 and the junction of the flexible strip 58 with the control arm 56. The tabs are provided with apertures 70 centrally therein, and a pin 72 is secured within the apertures 70. An L-shaped member 74 with a slot 76 extending inwardly at the junction of its short portion 78 and longer portion 80 is slidably disposed on the pin 72. A slot 82 is disposed in the control arm 56 between the two tabs 68, and the longer portion 80 of the L-shaped member 74 extends through the slot 82.

The slot 82 permits rotation of the L-shaped member 74 about the pin 72; however, the short portion 78 of the L-shaped member 74 is sufficiently long to abut the control arm 56 and form a pivot point to cause the L-shaped member to slide on the pin 72 and raise the flexible strip when the L-shaped member 74 is rotated in the clockwise direction. The L-shaped member 74 pivots on the end of the short portion 78 thereof to translate the shaft 50 relative to the sleeve 52. Clockwise rotation of the L-shaped member 74 results in raising the impeller discs 38 and 40, since they are journaled upon the shaft 16, and increasing the hydraulic coupling between the impeller disc 38 and the disc 34 while decreasing the hydraulic coupling between the impeller discs 32 and 40.

A motor 84, which is preferably a constant speed motor of the synchronous type, is provided with a pulley 86, and a flexible belt 88 is disposed between the pulley 86 and a pulley 90 attached to the end of the shaft 50 adjacent to the groove 54 therein. The motive power for the supply reel 12 and take-up reel 14 is transmitted to the hydraulic coupling unit 20 in this manner. A pair of guide pulleys 92 and 94 which are mounted upon a bracket 96 secured to the base 10 maintain the belt 88 parallel to the pulleys 90 and 86.

The end of the arm 56 opposite to the shaft 50 is provided with an outwardly extending finger 98 which rides upon the bottom surfaces 101 of an annular cam 100. The surface 101 of the cam 100 is flat and disposed on an angle relative to the axis of the cam 100. A knob 102 is positioned upon the face of the base 10 to enable an operator to select one of the three operating positions, reverse, play, and fast forward, these positions being designated by the letters "R," "P," and "FF" in Figure 1. The finger 98 is maintained in position against the surface of the cam 100 by a helical spring 104 attached to the control arm 56 and the bottom surface of the base plate 10, this spring also balancing the torque applied to the end of the control arm 56 by the shaft 50 and its associated elements.

In order to place the drive mechanism in the reverse position, the knob 102 is positioned with the dot thereon confronting the letter "R" as shown in Figure 1. This position of the cam 100 raises the finger 98, and hence the control arm 56, to its highest position relative to the base 10. As a result, the shaft 50 falls within the sleeve 52 and positions the impeller disc 40 in close proximity to the impeller disc 32, thus providing much greater coupling between the discs 32 and 40 than between the discs 34 and 38. As a result, the torque applied to the supply reel 12 greatly exceeds the torque applied to the take-up reel 14. The torque applied to both the supply reel 12 and the take-up reel 14 is in the clockwise direction, and hence the wire or tape threaded upon the machine will travel to the supply reel 12 from the take-up reel 14 through a path which will be described hereinafter.

If the knob 102 is rotated approximately 180 degrees to the fast forward position, the lowest portion of surface 101 of the cam 100 will abut the finger 98, thus lowering this end of the control arm 56 and raising the shaft 50 within the sleeve 52 to its maximum height. As a result, the impeller disc 38 confronts the impeller disc 34 as closely as permissible, and the impeller disc 32 is spaced from the impeller disc 40 by as large a distance as possible. This causes the torque applied to the impeller disc 34 to greatly exceed that applied to the impeller disc 32, and hence the torque applied to the take-up reel 14 greatly exceeds that applied to the supply reel 12. Since the torque applied to both take-up and supply reels is in the clockwise direction, the tape will travel from the supply reel to the take-up reel 14 at its maximum rate.

When the knob 102 is positioned in the play position, the finger 98 attached to the end of control arm 56 abuts the surface 101 of the cam 100 at a position intermediate its maximum and minimum altitudes. In this position, the impeller disc 38 is spaced from the impeller disc 34 by approximately the same distance as the impeller disc 32 is spaced from the impeller disc 40. As a result, the torques applied to the take-up reel 14 and the supply reel 12 are approximately equal. Therefore, when the control knob 102 is placed in the play position, the hydraulic drive unit 20 does not advance or rewind the tape, but merely applies a constant torque in the clockwise direction upon both the supply reel 12 and the take-up reel 14.

The tape, designated 106 in the figures, is threaded about a pulley 108 rotatively mounted at one end of the inclined plane 110. From the pulley 108, the tape extends parallel to the axis of the inclined plane and around a second pulley 112 rotatively mounted at the other end of the inclined plane 110. The tape 106 is then secured to the take-up reel 14. Between the two pulleys 108 and positioned to abut the tape 106 are a recording head 114, an erasing head 116, and a reproducing head 118. The three heads 114, 116 and 118 are disposed within a common housing 120 which guides the tape on its path between the first pulley 108 and the second pulley 112. A cylindrical capstan 122 extends through the inclined plane 110 adjacent to the path of the tape 106. The capstan 122 alone supplies the motivating force for translating the tape 106 along its path when the knob 102 is positioned in the play position, the hydraulic drive unit 20 merely placing a tension upon the tape 106 to maintain it taut and in contact with the recording head 114 and the reproducing head 118.

A disc 124 is attached to the capstan 122 beneath the inclined plane 110. The disc 124 has a circular ridge 126 on its surface opposite to the base 10 coaxial with the disc 124. The disc 124 also has a second circular ridge 128 coaxial with the first ridge 126 and disposed about the periphery of the disc 124. The motor 84 is provided with a wheel 130 adjacent to the pulley 86 which abuts either the ridges 126 or 128 of the disc 124 in order to rotate the disc 124, and hence the capstan 122. When the wheel 130 abuts the outer ridge 128 of the disc 124, the rotation rate of the capstan 122 is lower than that when the wheel 130 abuts the inner ridge 126, thus providing two translation rates for the tape 106, the lower rate for example being 7½ inches per second and the higher rate being 15 inches per second. The ridges 126 and 128 should be thin, for example 0.062 inch, and may be as little as 0.040 inch high.

The motor 84 is mounted upon a slide 132 which is provided with a handle 134 which extends through a slot 136 in the base 10. When the handle 134 is pushed to the end of the slot adjacent to the capstan 122, the wheel 130 abuts the raised portion 126 of the disc 124, thus producing the highest rotation rate for the capstan 122 and the highest translation rate for the tape 106. When the handle 134 is positioned remotely from the capstan 122, the translation rate of the tape 106 is the lower one. The pulley 86 is slidably keyed to the motor 84, so that it is self-adjusting to changes in the position of the motor 84.

The tape 106 is maintained in contact with the capstan 122 by a tape depressor 138. The tape depressor 138 is mounted on a shaft 140 which traverses the inclined plane 110 adjacent to the second pulley 112 and supports an arm 142 provided with a pulley 144 at its end which contacts the tape 106 adjacent to the capstan 122. As illustrated in Figure 4, a lever arm 146 constructed of resilient material is attached to the end of the shaft 140 on the opposite side of the inclined plane 110. A member 150 shaped in the form of a right angle is pivoted at its vertex by a pin 152 attached to the base 10. One end of the member 150 is mechanically linked to the end of the arm 146 by a cord 154, which is guided by a pulley 155, and the other end of the member 150 abuts the cylindrical surface 157 of the cam 100. The cam 100 is mounted to the base 10 by a shaft 156 which is slidably disposed in a slot 159 in the base 10. The cam 100 is also provided with a slot 158 of sufficient size to accommodate a pin 161 secured to the base 10 beneath the pin 98 when the cam 100 is rotated to confront the pin 161 within the slot 158. The cam 100 may then be slid in the direction of the arrow to the play position, as indicated in Figure 1. In this position, the cord 154 is placed under tension to stress the arm 146 and place tension between the pulley 138 and the tape 106, thus causing the capstan 122 to drive the tape 106. Due to the slot 158 in the cam 100 and the pin 161, the cam 100 may not be rotated when in this position, thus making certain that forward and reverse operations do not occur simultaneously.

Even though the cam 100 positions the control arm 156 to apply equal torque to the take-up reel 14 and supply reel 12 when the knob 102 is positioned in the play position, a difference exists in the torque applied to the two reels depending upon the amount of tape disposed upon the supply reel 12. This results from the operation of an arm 160 which is mounted upon the shaft 162 journaled within the pulley 108, the arm 160 being provided with a pair of spaced fingers 164 at its end. The tape 106 from the supply reel 12 travels between the fingers 164, thus establishing the position of the arm 160 as a measurement of the amount of tape upon the supply reel 12. The shaft 162 extends through the base 10, and an outwardly extending arm 166 is secured to the shaft 162 adjacent to the bottom of the base 10. A shaft 168 is secured to the end of the arm 166 and connected to the end of the L-shaped member 74, previously described. As a result of this construction, a decrease in the amount of tape on the supply reel 12 results in raising the shaft 50 within the sleeve 52 and decreasing the coupling between the impeller discs 32 and 40, and hence decreasing the torque upon the supply reel 12. Since this torque is in a direction to oppose the direction of rotation of the supply reel 12, it has the effect of compensating for the increase in the tension on the tape between reel 12 and the capstan 122 caused by the reduction in the effective diameter of the supply reel as a result of removal of tape therefrom.

Since the supply reel 12 is mounted above and coaxially with the take-up reel 14, two difficulties are encountered. The first difficulty occurs from the fact that the level of the tape coming from the supply reel is different from the level of the tape entering the take-up reel 14. This difficulty is eliminated by running the tape down the inclined plane 110, the pulley 108 being at the level of the supply reel 12, and the pulley 112 being at the level of the take-up reel 14. The second difficulty encountered by this construction is that the tape supply reel 12 hinders threading of the tape take-up reel 14. This difficulty is eliminated by mounting the tape supply reel 12 on a bracket 170 which may be raised above the take-up reel 14 to facilitate threading the take-up reel 14.

The bracket 170 is in the form of an elongated strip having two parallel portions 172 and 174 and an interconnecting portion 176. The portion 172 is disposed above the base 10 and extends over the shaft 16 and sleeve 18, and the portion 174 is disposed below the base 10, the portion 176 therebetween traversing a slot 178 in the base 10. The bracket 170 has a shoulder 180 which abuts the base 10 and pivotally mounts the bracket 170. A helical compression spring 182 is secured to the end of the portion 174 at one end and abuts a bracket 184 which is secured to the base 10 at the other end thereof, thereby providing sufficient spring bias to hold the tape reel 12 away from the reel 14 during threading operations. After threading, the bracket 170 is pushed into contact with the shaft 16, and the weight of the tape reel 12 holds it in position. The portion 172 of the bracket 170 is provided with an aperture 186 which confronts the shaft 16, and a spindle 188 is rotatively disposed within the aperture 186. The spindle 188 is secured to the bracket 170 by roller bearings 190 attached to the bracket 170 and journaled about the spindle 188 and a retaining ring 192 abutting the bracket 170 on the side opposite to the roller bearings 190. The spindle 188 is provided with a table 194 adjacent to the roller bearings 190 to support a reel of tape.

The spindle 188 extends through the bracket 170 and is provided with a splined end 196, and the shaft 16, which extends coaxially within the sleeve 18, is provided with a slotted end 198 into which the splined end 196 of the spindle 188 is disposed. The splined end 196 of the spindle 188 and the slotted end 198 of the shaft 16 are maintained in contact by the spring bias supplied by the spring 182.

In order to thread a reel of tape which is disposed upon the spindle 188 of the drive mechanism, the arm 170 is first raised and the free end of the tape 106 is then placed upon a take-up reel 14 which is positioned upon the sleeve 18 in the conventional manner. The tape 106 is then wound about the freely rotating second pulley 112, positioned between the capstan 122 and the tape depressor 138, positioned to confront the heads 114, 116, and 118, looped about the freely rotating first pulley 108, and positioned between the fingers 164 of arm 160. All of these threading operations are accomplished while the compression spring 182 holds the supply reel 12 away from the take-up reel 14 in order to permit easier access to the take-up reel 14. The supply reel 12 is then lowered, and the weight of the supply reel 12 maintains it in its operating position, the spindle 188 being keyed to the shaft 16. The drive mechanism is then ready for operation.

Many of the features of the drive mechanism described herein are not fundamental to the practice of the present invention, although they contribute to the invention. For example, the present invention may be practiced without the use of a capstan by directly translating the tape or wire by means of a hydraulic coupling unit. Further, more than a single motor could also be employed to drive the tape, one motor being used to supply the motivating power for the hydraulic coupler and the second motor being used to drive the capstan. Further, in certain embodiments of the invention the supply and take-up reels may not be coaxially disposed. It is therefore intended that the scope of the present invention be not limited by the specific foregoing disclosure, but rather only by the appended claims.

The invention claimed is:

1. A driver unit comprising a fluid tight housing, a viscous fluid disposed within the housing, a first and a second parallel shaft rotatably journaled within the housing, a first spur gear secured to the first shaft, a second spur gear journaled about the second shaft and meshed with the first spur gear, a first and second fluid impeller journaled about the second shaft and secured to the second spur gear, a sleeve coaxially journaled about the second shaft, a third fluid impeller journaled about the second shaft confronting the first fluid impeller and attached to the sleeve, and a fourth fluid impeller attached to the second shaft and confronting the second fluid impeller.

2. A drive unit comprising a fluid tight housing, a viscous fluid disposed within the housing, a first and second parallel shaft rotatably journaled within the housing, the first of said shafts being translatable relative to the housing, a first spur gear secured to the first shaft, a second spur gear journaled about the second shaft and meshed with the first spur gear, a first and second disc shaped fluid impeller journaled about the second shaft and secured to the second spur gear, said impellers having a larger diameter than the second spur gear, a sleeve coaxially journaled about the second shaft, a third disc shaped fluid impeller journaled about the second shaft confronting the first fluid impeller and attached to the sleeve, and a fourth disc shaped fluid impeller attached to the second shaft and confronting the second fluid impeller, whereby translation of the first shaft relative to the housing changes the relative coupling to the third and fourth impellers.

3. A tension mechanism for tape or wire comprising a fluid tight housing, a viscous fluid disposed within the housing, a first and second parallel shaft rotatably journaled within the housing, a first spur gear secured to the first shaft, a second spur gear journaled about the second shaft and meshed with the first spur gear, a first and second fluid impeller journaled about the second shaft and secured to the second spur gear, a sleeve coaxially journaled about the second shaft, a third fluid impeller journaled about the second shaft confronting the first fluid impeller and attached to the sleeve, a fourth fluid impeller attached to the second shaft and confronting the second fluid impeller, a take-up reel coupled to the sleeve and disposed coaxially therewith, and a supply reel coupled to the second shaft and disposed coaxially therewith.

4. A tension mechanism for tape or wire comprising a fluid tight housing, a viscous fluid disposed within the housing, a first and second parallel shaft rotatably journaled within the housing, a first spur gear secured to the first shaft, a second spur gear journaled about the second shaft and meshed with the first spur gear, a first and second fluid impeller journaled about the second shaft and secured to the second spur gear, a sleeve coaxially journaled about the second shaft, a third fluid impeller journaled about the second shaft confronting the first fluid impeller and attached to the sleeve, a fourth fluid impeller attached to the second shaft and confronting the second fluid impeller, a take-up reel coupled to the sleeve and disposed coaxially therewith, a supply reel coupled to the second shaft and disposed coaxially therewith, and means to rotate the first shaft in the direction applying torque to the take-up reel in the direction of take-up.

5. A tension mechanism for an elongated mass comprising a fluid tight housing, a viscous fluid disposed within the housing, a first and second parallel shaft rotatably journaled within the housing, the first of said shafts being translatable relative to the housing, a first spur gear secured to the first shaft, a second spur gear journaled about the second shaft and meshed with the first spur gear, a first and second disc shaped fluid impeller journaled about the second shaft and secured to the second spur gear, said impellers having a larger diameter than the second spur gear, a sleeve coaxially journaled about the second shaft, a third disc shaped fluid impeller journaled about the second shaft confronting the first fluid impeller and attached to the sleeve, a fourth disc shaped fluid impeller attached to the second shaft and confronting the second fluid impeller, whereby translation of the first shaft relative to the housing changes the relative coupling to the third and fourth impellers, a take-up reel coupled to the sleeve and disposed coaxially therewith, a supply reel coupled to the second shaft and disposed coaxially therewith, means to rotate the first shaft in the direction applying torque to the take-up reel in the direction of take-up, and means for positioning the first shaft relative to the housing responsive to the difference in the quantity of the elongated mass disposed on the supply reel and take-up reel, said means decreasing the torque to the supply reel and increasing the torque to the take-up reel as the amount of tape on the supply reel decreases.

6. A tension mechanism for an elongated mass comprising a fluid tight housing, a viscous fluid disposed within the housing, a first and second parallel shaft rotatably journaled within the housing, a first spur gear secured to the first shaft, a second spur gear journaled about the second shaft and meshed with the first spur gear, a first and second fluid impeller journaled about the second shaft and secured to the second spur gear, a sleeve coaxially journaled about the second shaft, a third fluid impeller journaled about the second shaft confronting the first fluid impeller and attached to the sleeve, a fourth fluid impeller attached to the second shaft and confronting the second fluid impeller, a take-up reel disposed exterior to the housing and coupled to the sleeve and disposed coaxially therewith, a supply reel disposed exterior to the housing and attached to the second shaft, one of said reels being disposed at a different level relative to the housing than the other reel, and means to guide the elongated mass from the level of the supply reel to the level of the take-up reel.

7. A tape drive mechanism comprising a fluid tight housing, a viscous fluid disposed within the housing, a first and second parallel shaft rotatably journaled within the housing, a first spur gear secured to the first shaft, a second spur gear journaled about the second shaft and meshed with the first spur gear, a first and second fluid impeller journaled about the second shaft and secured to the second spur gear, a sleeve coaxially journaled about the second shaft, a third fluid impeller journaled about the second shaft confronting the first fluid impeller and attached to the sleeve, a fourth fluid impeller attached to the second shaft and confronting the second fluid impeller, a take-up reel coupled to the sleeve and disposed coaxially therewith, one of said reels being disposed at a different level relative to the housing than the other reel, means to guide the elongated mass from the level of the supply reel to the level of the take-up reel including a pulley at the level of the supply reel and a pulley at the level of the take-up reel, a capstan rotatably disposed between the two pulleys adapted to bear against the tape, and means to rotate the capstan at a constant rate.

8. A tension mechanism for an elongated mass comprising a fluid tight housing, a viscous fluid disposed within the housing, a first and second parallel shaft rotatably journaled within the housing, the first of said shafts being translatable relative to the housing, a first spur gear secured to the first shaft, a second spur gear journaled about the second shaft and meshed with the first spur gear, a first and second disc shaped fluid impeller journaled about the second shaft and secured to the second spur gear, said impellers having a larger diameter than the second spur gear, a sleeve coaxially journaled about the second shaft, a third disc shaped fluid impeller journaled about the second shaft confronting the first fluid impeller and attached to the sleeve, a fourth disc shaped fluid impeller attached to the second shaft and confronting the second fluid impeller, whereby translation of the fourth shaft relative to the housing changes the relative coupling to the third and fourth impellers, a take-up reel coupled to the sleeve and disposed coaxially therewith, a supply reel coupled to the second shaft and disposed coaxially therewith, means to rotate the first shaft in the direction applying torque to the take-up reel in the direction of take-up, and means for positioning the first shaft relative to the housing responsive to the quantity of the elongated mass disposed on the supply reel, said means including an arm pivotally mounted relative to the housing on an axis parallel to the axis of the supply reel, a pair of parallel fingers extending outwardly from the arm adapted to guide the tape therebetween, and a mechanical linkage disposed between the arm and the first shaft translating the angular position of the arm into the relative position of the first shaft to the housing, said linkage raising the first shaft as the amount of tape on the supply reel decreases.

9. A drive mechanism comprising the elements of claim 8 wherein the mechanical linkage between the arm and the first shaft comprises a control arm, means to pivotally mount said control arm relative to the housing, a flexible member secured to the arm at one end and to the first shaft at the other end, a lever arm pivotally mounted to the control arm having a portion extending between the control arm and the flexible strip and another portion mechanically coupled to the arm adapted to engage the tape.

10. A device for translating an elongated mass comprising a support member, a sleeve journaled within the support member, means to mount a first reel to the sleeve, a shaft journaled within the sleeve having a slotted end protruding from the sleeve, a bracket pivotally mounted to the support member and extending over the shaft, a spindle journaled within the bracket confronting the shaft, said spindle having a splined end extending from the bracket engaging the slotted end of the shaft, said spindle being adapted to mount a second reel, and means to rotate the sleeve and the shaft independently.

11. A device for translating an elongated mass comprising a support member, a sleeve journaled within the support member, means to mount a first reel to the sleeve, a shaft journaled within the sleeve having a slotted and protruding from the sleeve, a bracket pivotally mounted to the support member and extending over the shaft, a spindle journaled within the bracket confronting the shaft, said spindle having a splined end extending from the bracket engaging the slotted end of the shaft, said spindle being adapted to mount a second reel, means to apply force upon the bracket to maintain the spindle out of engagement with the shaft for threading operations, and means to independently rotate the sleeve and the shaft.

12. A device for translating an elongated mass comprising a support member, a sleeve journaled within the support member, means to mount a first reel to the sleeve, a shaft journaled within the sleeve, a bracket, means to pivotally mount the bracket to the support member, said bracket extending through an aperture in the support member and over the shaft, a spindle journaled within the bracket confronting the shaft, said spindle and shaft having mating keys adapted to engage each other when brought into contact, and said spindle being adapted to mount a second reel, a helical compression spring attached to the bracket between the pivotal mounting means and the end opposite to the spindle, said spring surrounding the bracket and extending toward the pivotal mounting means, and a plate mounted to the support member adjacent to the pivotal mounting means, the end of the spring being secured to the plate.

References Cited in the file of this patent

UNITED STATES PATENTS

| | | |
|---|---|---|
| 1,276,379 | Lindquist | Aug. 20, 1918 |
| 1,465,505 | Zoergiebel | Aug. 21, 1923 |
| 1,499,521 | Hagemann | July 1, 1924 |
| 1,548,960 | Stuber et al. | Aug. 11, 1925 |
| 1,862,267 | Honig | June 7, 1932 |
| 2,321,812 | Heller et al. | June 15, 1943 |
| 2,385,059 | Buthe | Sept. 18, 1945 |
| 2,427,432 | Wilhelmy | Sept. 16, 1947 |
| 2,542,917 | Fischer et al. | Feb. 20, 1951 |
| 2,576,156 | Trofimov | Nov. 27, 1951 |
| 2,732,144 | Jones | Jan. 24, 1956 |
| 2,757,550 | Weinfurt | Aug. 7, 1956 |

FOREIGN PATENTS

| | | |
|---|---|---|
| 704,798 | Great Britain | Mar. 3, 1954 |

UNITED STATES PATENT OFFICE
CERTIFICATION OF CORRECTION

Patent No. 2,937,816 May 24, 1960

John F. Wood

It is hereby certified that error appears in the above numbered patent requiring correction and that the said Letters Patent should read as corrected below.

Column 9, line 41, for "slotted and" read -- slotted end --.

Signed and sealed this 16th day of May 1961.

(SEAL)
Attest:

ERNEST W. SWIDER
Attesting Officer

DAVID L. LADD
Commissioner of Patents